Oct. 27, 1959  W. J. O'DONNELL  2,909,894
COMPOSITE POWER PLANT
Original Filed Sept. 23, 1953  2 Sheets-Sheet 2
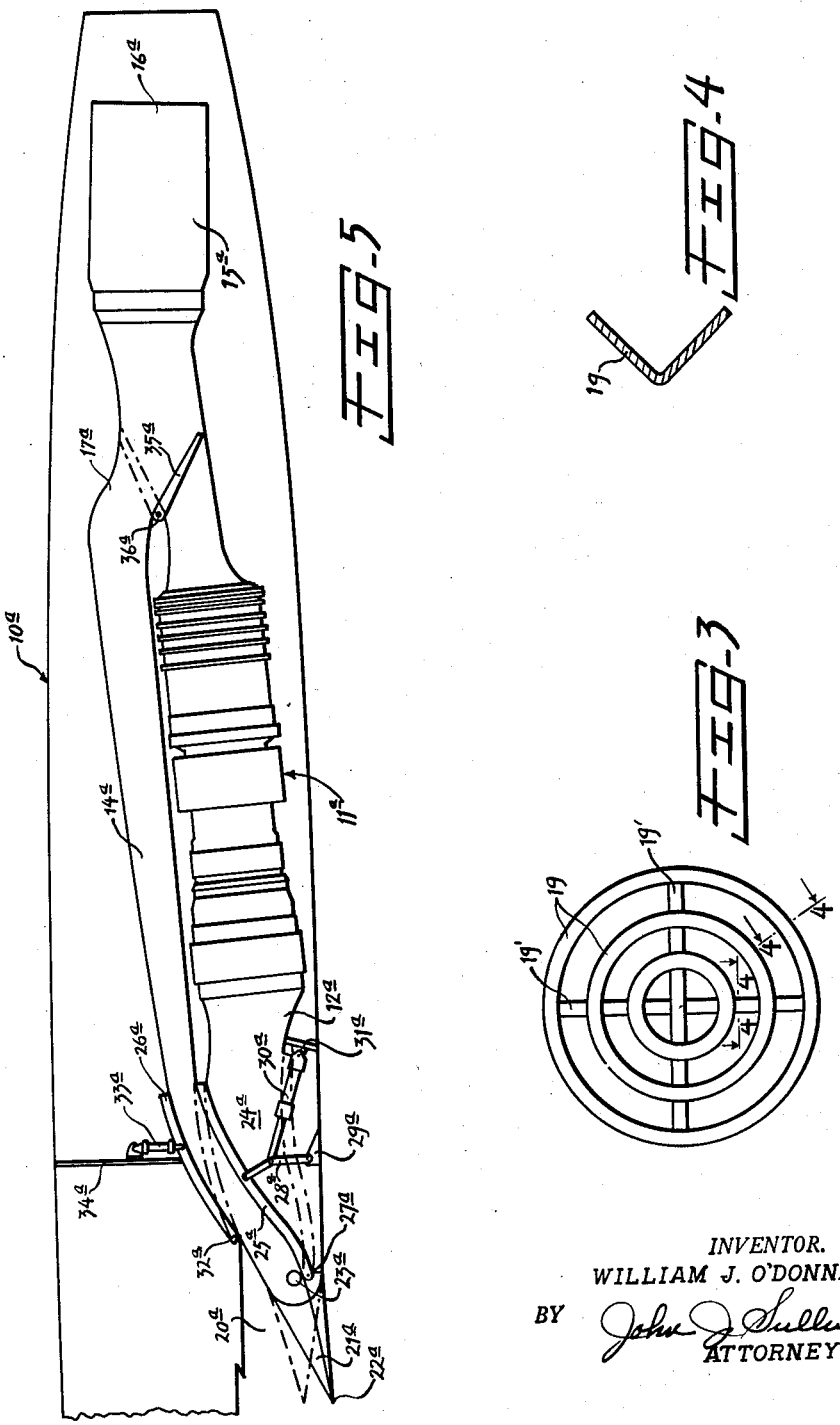
INVENTOR.
WILLIAM J. O'DONNELL
BY *John J. Sullivan*
ATTORNEY

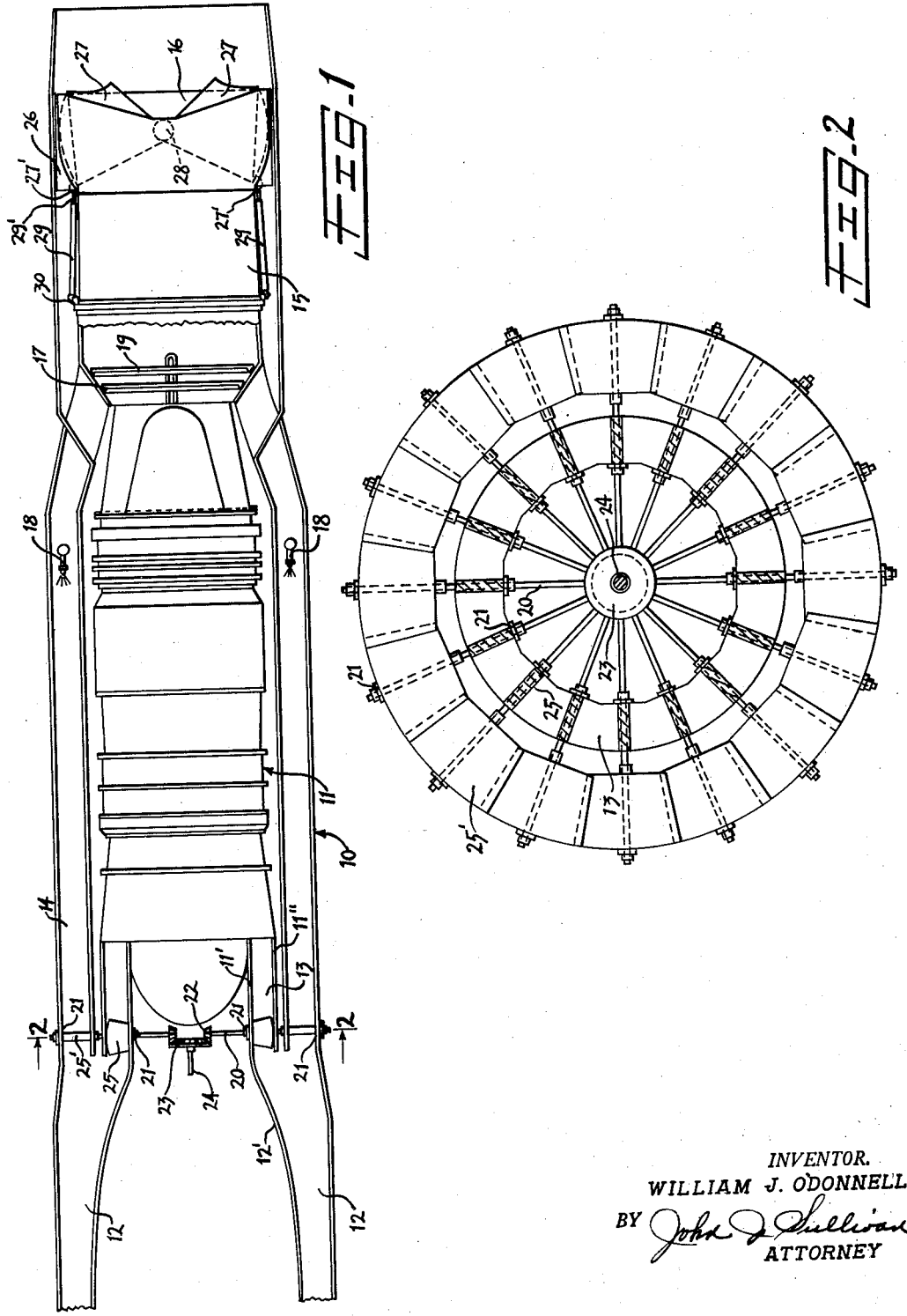

United States Patent Office 2,909,894
Patented Oct. 27, 1959

2,909,894

COMPOSITE POWER PLANT

William J. O'Donnell, Freeport, N.Y., assignor to Republic Aviation Corporation, Farmingdale, N.Y., a corporation of Delaware Original application September 23, 1953, Serial No. 381,904. Divided and this application September 4, 1958, Serial No. 765,689

7 Claims. (Cl. 60—35.6)

This invention relates in general to power plants of the jet propulsion type, and particularly to a power plant primarily designed for aircraft which comprises in combination a turbo-jet engine and a ram-jet engine for individual and alternate operation.

Additionally, the instant invention contemplates the use of an air intake duct in unrestricted communication with the airstream and common to both engines and a combustion chamber for the ram-jet engine which is adapted and disposed as an after-burner during the operation of the turbo-jet engine.

Among its other objects the present invention has in view control means interposed between the turbo-jet and ram-jet alternates of the composite engine for the operative selection, upon the attainment of predetermined flight conditions of the aircraft, of one or the other of said engine alternates.

With the above and other objects in view, as will be apparent, this invention consists in the construction, combination and arrangement of parts, all as hereinafter more fully described, claimed and illustrated in the accompanying drawings, wherein:

Fig. 1 is a longitudinal section through the fuselage of an aircraft employing a combined turbo-ram jet engine made in accordance with the present invention and shows a preferred form thereof;

Fig. 2 is a transverse section taken along line 2—2 of Fig. 1 to show the relative positions of the control means which determine the operation of either the ram-jet or, in the alternative, the turbo-jet engine;

Fig. 3 is an end elevation of a restrictor or flameholder employed in conjunction with the combustion chamber of the ram-jet engine;

Fig. 4 is a section taken along lines 4—4 of Fig. 3; and

Fig. 5 is a view similar to Fig. 1 to show a modified form of the present invention.

It is commonly known that there is a tapering off or decrease in efficiency of the turbo-jet engine of an aircraft as the aircraft attains speeds in the super-sonic range. Thereafter the efficiency continues to decrease more rapidly. It is at the same time well known that a ram-jet engine which has little or no efficiency at relatively low speeds, becomes efficient at speeds approaching or in the sonic range and thereafter its efficiency will increase with (but not in direct proportion to) the increase of speed of the aircraft.

Predicated on the foregoing many attempts have been made to build an airplane which is equipped with two engines, one turbo-jet and one ram-jet, to be individually and selectively operated under different flight conditions. It was, and is, the intention of these designs to produce an aircraft, the engine of which is at all times capable of operating at maximum efficiency. However, as far as is known, these attempts have all, for various reasons, proved fruitless, for adaptation of the two engines in a single aircraft for practical alternate operation has not as yet been accomplished.

For the use of a turbo-jet ram-jet composite engine in an aircraft it is necessary to devise an arrangement whereby the two engines are associated with a common air intake means or duct and also with a combustion chamber, which is common to both engines, i.e., the engines are disposed in tandem as distinguished from being disposed in parallel one to the other. The limited space available within the aircraft and the necessity to reduce weight to a minimum makes the duplication or multiplications of elements objectionable. Moreover, the excessive resistance or drag which would be developed through an idle or nonoperative engine or system in the parallel arrangement would seriously impair the operation of the airplane.

At the same time, however, employment of the tandem arrangement gives rise to certain problems, one of which is the different requirements of the inlet and exit areas of a turbo-jet engine from those of a ram-jet. Broadly speaking, and at some risk of oversimplification, it may be said that a turbo-jet requires smaller area air inlet and exhaust or outlet openings than a ram-jet. This, of course, overlooks the fact that for maximum efficiency of either the ram or turbo-jet engine various intermediate adjustments are required and these depend upon the particular speed and/or flight conditions of the aircraft at the moment.

The present invention is directed to the solution of the above and other problems incidental to the construction of an aircraft designed to embody both a ram-jet and turbo-jet engine. To this end it is proposed that the composite engine shall consist of a turbo-jet engine, an air inlet duct through which air taken into the aircraft from the airstream is conducted to the turbo engine, a combustion chamber located at the aft end of the turbo-jet, an exhaust outlet, an independent by-pass duct disposed between the air inlet duct aforesaid and the combustion chamber and control means associated with the by-pass duct and turbo-jet to operatively connect in the alternative the by-pass duct or the turbo-jet to said air inlet duct and the combustion chamber.

Moreover, the present invention also contemplates adjustment and regulating means which may be manually operable or may be automatically responsive to flight conditions of the aircraft for the variation of the effective cross-sectional area of the inlet and outlet openings in conjunction with the operation of the combination turbo-ram jet engine.

Referring more particularly now to the drawings, 10 designates that portion of the fuselage or component of the aircraft in which the power plant is to be located. A conventional or standard turbo-jet engine 11 is mounted in any acceptable manner more or less centrally in this area so as to be fixedly secured relative to the airframe. By a standard turbo-jet engine is meant one which consists of a forward air compressor, a central combustion chamber and a rearward turbine, the high velocity jet exhaust of which provides the engine with a forward propulsive thrust.

In the form of the invention illustrated in Figs. 1 and 2, air is delivered to the turbo-jet engine 11 from outside the aircraft through an inlet duct 12. The duct 12 is concentrically disposed relative to the turbo-jet 11 and immediately forward thereof. Adjacent the nose of the turbo-jet 11, the inner wall 12' of duct 12 converges and thereafter extends parallel to the longitudinal centerline thereof to a point where it joins the inner wall 11' of the annular air inlet of the turbo-jet. The outer wall 11'' of the air inlet of the turbo jet 11 terminates in substantially the same plane as the inner wall whereby an extended annular air intake duct 13 is created for the turbo-jet engine.

Concentrically disposed about and outwardly of the duct 13 is a somewhat wider, annular by-pass duct 14 which extends the full length of, and parallel with, the turbo-jet engine 11, the outer wall or skin of which constitutes a continuation of the outer wall of duct 12. Hence, duct 14 like duct 13, is contained within and is a continuation of duct 12, so that it may be said that duct 12 divides at this point into two separate and individual air passages or conduits, viz., duct 13 and duct 14. Duct 13 serves to direct the air passing through, and received by it from duct 12 into the turbo-jet engine 11, or more particularly into the compressor thereof, while duct 14 serves to conduct air passing through, and received by it from duct 12 around, so as to completely by-pass, the turbo-jet 11.

Immediately aft of the turbo-jet 11 and in free and open communciation therewith to receive the exhaust therefrom, is a combustion chamber 15. Fuel is supplied to this chamber 15 through any suitable connections and tubing where it is ignited or fired in the conventional manner and exhausted or discharged through the common tailpipe 16 disposed immediately aft of said combustion chamber.

The by-pass duct 14 communicates with or opens into the combustion chamber 15 at the forward end 17 thereof to the end that when air under pressure is brought through duct 14 into the chamber 15, it mixes with the fuel burning therein and ultimately is discharged through tailpipe 16, thereby developing a forward thrust for the aircraft. This constitutes a so-called ram-jet engine. It is further contemplated to provide fuel ejectors 18 of conventional design and connection in the duct 14 to produce an air-fuel mixture prior to delivery thereof into combustion chamber 15 where it is fired together with the additional fuel introduced to this chamber as aforesaid.

Since the exhaust from the turbo-jet 11 also passes into and through chamber 15, prior to being discharged through tailpipe 16, unburned fuel in these exhaust gases may be enriched by further fuel and is burned or fired in chamber 15 to provide the turbo-jet 11 with additional forward thrust. This burning of waste and/or enriched fuel in the exhaust gases from the turbo-jet constitutes an operation commonly referred to as afterburning. Hence, chamber 15, during the operation of the turbo-jet, functions as an afterburner for the turbo-jet to augment its thrust.

Inasmuch as fuel is first ignited in the combustion chamber of the turbo-jet engine 11, and discharged by the turbine thereof at high pressure, there is a tendency for the burning exhaust to move too rapidly through chamber 15. Therefore, one or more flameholders 19 are mounted in any suitable manner in the passage between chamber 15 and the aft end of engine 11 so as to project laterally from the entrance of the chamber 15 to partially restrict the passage through which these exhaust gases must pass.

Each flameholder 19 comprises a plurality of spaced, annular concentric rings all positioned to lie in a single plane and interconnected by one or more transverse members 19'. In cross-section each ring 19 and member 19' is V-shaped with the apex thereof forward or upstream so that the exhaust gases from the turbo-jet will be separated at that point and pass over the outwardly-sloping, adjoining surfaces thereof. In this way, a relatively low pressure area is created within the V-shaped rings 19 and members 19' and for a distance aft thereof into which flames from the burning gases are retained long enough to thoroughly ignite any unburned fuel in the fuel and air mixture discharged by the engine 11.

Since it is desired to employ the turbo-jet engine at relatively low speeds and the ram-jet at higher speeds, i.e., in the speed ranges where each is the more efficient, control means is provided in association with the inlet duct 13 and by-pass duct 14 to selectively and alternately effect the operation of either the turbo-jet or the ram-jet. This control means comprises a plurality of shafts 20, all of which are disposed in a single transverse plan to radiate from a point substantially on the longitudinal centerline about which the ducts 13 and 14 are commonly disposed. These shafts 20 extend to and through the outer wall which defines duct 14. Bearings 21 are provided in each of the walls of the ducts 13 and 14 to receive and support each shaft 20 where it passes through these walls.

At its inner end, each shaft 20 is secured or splined to a bevel gear 22 which is operatively connected to a driving bevel gear 23 disposed normal thereto. The drive gear 23 lies in the center from which the several shafts 20 radiate and is driven by a power shaft 24 that may be controlled in any manner.

Immovably mounted on that portion of each shaft 20, which lies between the walls of inlet duct 13 is a leaf or closure 25 having a width substantially equal to that of the duct 13. The leaves 25 are relatively thin in cross-section and each has a length sufficient to overlap the edges of the next adjacent leaves 25 when all of the blades are disposed in substantially the same plane, i.e., substantially aligned end to end one with the other to close the entrance to duct 13. A similar leaf or closure 25' is mounted on that portion of each shaft 20 disposed between the walls of by-pass duct 14 to function and operate in the same manner as do leaves 25. It is to be noted, however, that the leaves 25' are displaced ninety degrees (90°) with respect to leaves 25 and are therefore positioned at right angles relative to the latter. Thus, when the leaves 25 are disposed in substantial end to end alignment to close or block the inlet duct 13, leaves 25' are all approximately parallel one to the other to permit direct communication between duct 12 and the by-pass duct 14. Conversely, when leaves 25' are in substantial alignment so as to lie in a single plane to close duct 14, leaves 25 are approximately parallel one to the other to open duct 13 for direct and unobstructed communication with duct 12.

From the foregoing, it is apparent that either the ram-jet or turbo-jet engine may be selected for operation by the adjustment of the control means employed to rotate the drive shaft 24 in either direction for the oscillation of leaves 25 and 25'. Thus either of the ducts 13 or 14 may be opened when the other is simultaneously closed.

Since the requirements of the exit or exhaust opening or nozzle of a ram-jet differs from those of a turbo-jet, this invention also contemplates a device to alter or vary the area or size of the exit or exhaust opening within a predetermined range. In this manner the tailpipe 16 is provided with a variable area nozzle or discharge opening. As above noted, the ram-jet operation requires an exhaust opening of larger area than does the turbo-jet engine. However, it is also desirable to be able to vary the exit or discharge nozzle to some extent within certain ranges for both ram-jet and turbo-jet operations.

For this purpose, the aft extremity of tailpipe 16 may be enlarged, as at 26, to create a housing for the accommodation of a pair of clamshells 27 such as have heretofore been used in conjunction with turbo-jet engines. Each consists of a semi-spherical shell hinged at its opposed ends to the associated overlapping ends of the companion shell, as at 28. At least one bracket 27' is secured to the inner peripheral edge of each clamshell 27 so as to project outwardly for attachment and connection to suitable operating means. One example of such operating means comprises a hydraulic jack or motor 29. The piston rod 29' of the cylinder of the motor 29 is pivotally attached at its outer end to the bracket 27' of the shell 27 while the opposite end of the cylinder of the jack 29 is similarly connected at 30 to the outer wall of tailpipe 16.

Upon the operation of the hydraulic motor or jack 29, i.e., its extension or retraction, the clamshells 27 are made to rotate about the pivot or hinge 28 to alter the cross-sectional area of the exit opening of the tailpipe. Thus, while the ram-jet engine is operating, the motor or jack 29 will be operated to produce an exit opening of relatively large area. On the other hand, while the turbo-jet engine 11 is operating, the jack or motor 29 will be operated to create an exhaust opening of relatively small area. Manifestly, many mechanisms can be used for the adjustment of the shells 27 any of which may be employed without departing from the spirit and scope hereof.

Referring now to that form of the invention illustrated in Fig. 5, 10a designates a portion of the fuselage, nacelle or other component of an aircraft in which the power plant is located. A standard turbo-jet engine 11a comparable to that shown in Fig. 1 is fixedly mounted in this area in any suitable manner. At its nose or forward end, turbo-jet 11a is provided with an inlet duct 12a for the admission of air conducted thereto from outside the aircraft in a manner to be described.

Immediately aft of the turbo-jet 11a, and in free and open communication therewith to receive the exhaust therefrom, is a combustion chamber 15a. Fuel is supplied or delivered to the chamber 15a through suitable connections and tubing where it is burned or fired in the conventional manner and exhausted or discharged through a tailpipe 16a immediately aft thereof.

Substantially coextensive with the turbo-jet 11a, and parallel thereto is a by-pass duct 14a. At its aft end the by-pass duct 14a is bent at 17a, to communicate with or open into the combustion chamber 15a at its forward end.

From the foregoing it is apparent that inlet duct 12a serves to direct air into the turbo-jet 11a where it is compressed, mixed with fuel at or about the time the latter is fired and then discharged through a turbine in the usual manner into the chamber 15a. On the other hand duct 14a serves to conduct air so as to completely by-pass the turbo-jet 11a and deliver it directly into combustion chamber 15a, where it is mixed with burning fuel and discharged through the tailpipe 16a thereby developing a forward thrust.

When the exhaust from the turbo-jet engine 11a passes into combustion chamber 15a, the latter functions as an afterburner in the same manner as above described with reference to Fig. 1 whereby additional forward thrust is developed. In this regard, flameholders like those illustrated in Figs. 3 and 4 may be employed for the same purpose, the function being identical to that of the flameholders 19.

Air is supplied both to the turbo-jet 11a via duct 12a alternately to the ram-jet via by-pass duct 14a from the airstream from which it is taken in through an open scoop. This scoop 20a is located forward of the point where the ducts 12a and 14a may be said to merge or unite and is defined on one side by the skin of the fuselage or component 10a and on the opposed side by a pivoted or hinged forebody 21a, triangular or wedge shaped in longitudinal section and having its apex 22a projecting laterally from component 10a into the air stream.

The forebody 21a is hinged or pivoted at 23a to the leading end of scoop 20a whereby its position relative to, or spacing from, the component 10a may be adjusted to vary the captive area at the intake end of the scoop. Any appropriate or suitable means may be employed for this adjustment. Thus the cross-sectional area of the inlet of, or entrance to, the scoop 20a may be regulated and adjusted within the operational range of both the ram-jet and the turbo-jet engines, either manually by the pilot or automatically upon the occurrence of some predetermined ambient condition.

Since either the ram-jet engine or the turbo-jet engine is to be selectively and alternately connected to the scoop 20a for operation under compatible flight conditions, control means 24a is associated with the scoop 20a and the ducts 12a and 14a to directly connect either of these ducts to the scoop whereby air collected by the scoop is delivered only to the connected duct. This control means 24a consists of a pair of substantially parallel plates or gates 25a and 26a, the inner or facing surfaces of which form at all times continuations of the inner surfaces of the walls of the scoop 20a. When either duct 12a or duct 14a is connected to the scoop 20a unobstructed communication is established between said scoop 20a and the connected duct so that air from the scoop is directed for use in operating the engine with which such duct is associated.

To the above end the plate or gate 25a is pivotally connected at one of its ends to, or adjacent to, the inner end of the forebody 21a, as at 27a. Medially of its length the plate 25a is operatively connected to one end of a toggle 28a, the other end of said toggle 28a being pivotally secured to a stationary part 29a of the aircraft structure. A hydraulic jack or equivalent prime mover 30a is suitably anchored or secured to the structure of the aircraft, as at 31a and is operatively connected to the knee of the toggle 28a whereby to effect the rotation of plate 25a about its fixed pivot 27a to and from positions where its free end is aligned with a wall of either the duct 12a or the duct 14a. The operation of the prime mover 30a in one direction causes the toggle 28a to break while its operation in the opposite direction causes the arms or components of the toggle to tend to align. When the arms or components of the toggle 28a are substantially aligned, as shown in Fig. 5, the gate or plate 25a is disposed in alignment with the wall of the duct 14a. Thus disposed the plate 25a bridges the space between the forebody 21a of scoop 20a and the duct 14a and thereby constitutes a continuation of the wall of the duct 14a as well as of the wall of the scoop 20a and directs the air collected by the scoop to the duct 14a.

When the toggle 28a is broken by the operation of jack or other prime mover 30a the gate or plate 25a is swung about its pivot 27a to be disposed in alignment with the wall of the duct 12a. Thus disposed the plate or gate 25a permits access to the duct 12a and forms one side of a conduit serving to direct air from the scoop 20a to the duct 12a.

The plate or gate 26a is pivoted or hinged at one of its ends 32a to the structure of the aircraft to at all times rest substantially parallel to plate 25a. A power means or hydraulic jack 33a similar to the prime mover 30a is operatively connected to the plate 26a near its free end and at its opposite end is secured to a fixed structure or bulkhead 34a in the aircraft component 10a. Thus, upon operation of the jack 33a, the plate or gate 26a is swung about its pivot 32a to and from a position where its free end abuts the wall of the duct 12a. When so disposed the plate or gate 26a becomes a continuation of the walls of both the duct 12a and the scoop 20a and combines with the gate or plate 25a to establish a conduit between the scoop 20a and the duct 12a.

The plates or gates 25a and 26a are always substantially parallel so that when the jack 30a operates to place the plate 25a in alignment with the wall of the duct 14a, as shown in Fig. 5, the jack 33a operates to retract the plate 26a to a position where it coacts with the plate 25a to direct air from the scoop 20a to the duct 14a. This adjustment of the plate 25a also closes access from the scoop 20a to the duct 12a. Upon reversing the positions of the plates 25a and 26a, the latter then closes access to the duct 14a while the former is disposed to permit the passage of air from the scoop 20a to the duct 12a.

Manifestly, the invention contemplates the operation of the power jacks or units 30a and 33a in unison either manually or automatically to the end that plates 25a and 26a will be simultaneously adjusted and readjusted to connect and initiate the operation of either the ram-jet or the turbo-jet engine. The specific means for accomplishing this operation of the jacks 30a and 33a forms no part of the invention and any electrical, hydraulic, mechanical or pneumatic means may be employed for that purpose. Moreover, this operation may be automatic if desired through the use of devices which are responsive to predetermined atmospheric or flight conditions without departing from the spirit and scope hereof.

For synchronous and coordinate movement with the control means 24a, an auxiliary control or valve 35a is provided at the aft end of the by-pass duct 14a and turbo-jet engine 11a. This valve 35a is mounted to swing on a pivot 36a disposed at the junction between the aft extremity of duct 14a and the exit conduit of turbo-jet engine 11a, a point which is somewhat forward of the combustion chamber 15a. The rotation of valve 35a about its pivot 36a is such that at one end of its path of movement it is disposed across the end of duct 14a where it opens the exit conduit of the turbo-jet engine 11a and at the other end of its path of movement it is disposed across the aft end of exit conduit of the turbo-jet engine 11a. Thus, in one of its extreme positions, it closes or blocks off the by-pass duct 14a to allow operation of the turbo-jet engine and in its other extreme position it closes or blocks off the exit conduit of the turbo-jet engine 11a to allow operation of the ram-jet engine. These positions correspond to the two adjusted positions of the control means 24a, i.e., when the control 24a is adjusted for the operation of the turbo-jet engine, valve 35a is simultaneously moved to close by-pass duct 14a whereby the turbo-jet exhaust conduit is opened.

Like the form of the invention illustrated in Fig. 1, this modification of the invention is also provided with means for varying the area of the tailpipe 16a for the adjustment of the exit orifice or exhaust opening thereof. Either the clamshell mechanism hereinabove described or any other suitable device may be employed for this purpose. One such device may be the variable area nozzle for jet engines illustrated in the copending application of Walter R. Bush, filed June 8, 1950, now Patent Number 2,778,190. The variable area mechanism per se forms no part of this invention, save that the invention contemplates the use of such a device and any device capable of producing the desired result will be satisfactory.

What is claimed is:

1. A power plant for aircraft comprising a turbo-jet engine and a ram-jet engine disposed in tandem and having a common exhaust duct for individual and alternate operation, an air intake individual to each of said engines, an air inlet duct common to both of said air intakes for receiving air from the airstream, and a unitary valve assembly having elements disposed in each of said intakes, the elements in one intake being positioned at right angles to the elements in the other intake whereby the valve assembly simultaneously opens one of the intakes and closes the other for the delivery of air from the common inlet duct to a selected one of the air intakes.

2. A power plant for aircraft comprising a turbo-jet component and a ram-jet component organized and arranged in tandem on approximately the same common axis, an air intake duct individual to each component, an air supply conduit common to and connected with said intakes, and a unitary rotary control valve comprising a set of coacting vanes mounted in each duct, the vanes in one duct being disposed at all times at right angles to the vanes in the other duct whereby one set of vanes closes and the other set of vanes concurrently opens its respective duct and air from said conduit is directed exclusively through a selected one of said ducts.

3. In a power plant for aircraft the combination with a turbo-jet component and a ram-jet component including an annular air inlet duct individual to each of said engines and a conduit open at one end to the airstream and in communication with each of said inlet ducts at its other end to constitute a continuation thereof, of a control mechanism comprising a plurality of radial shafts, the outer ends of which extend through the inlet ducts aforesaid, driving means for the rotation of said shafts in unison, and a plate affixed to that portion of each shaft within the inlet ducts, each of said plates having a width substantially equal to the width of the duct in which it is located and a length sufficient to overlap the adjoining plates of the same duct when positioned end to end therewith whereby the passage in that duct is completely closed, all the plates located in one of said ducts being disposed at right angles to the plates located in the other duct whereby the passage through only one of the ducts is open at a time.

4. A power plant for aircraft comprising a turbo-jet, an air intake duct at the forward end of said turbo-jet, an inlet duct for the delivery of air from the airstream to said intake duct, an exhaust duct at the aft end of the turbo-jet for the discharge of gases from the turbo-jet to provide forward propulsive thrust, a combustion chamber disposed rearwardly of the turbo-jet for the after-burning of the exhaust gases therefrom prior to discharge from the exhaust duct whereby augmented forward thrust is provided, an annular by-pass duct concentrically disposed relative to the turbo-jet and opening at its forward end in the inlet duct and at its aft end into the combustion chamber, a closure disposed in the intake duct parallel to the axis of said intake duct and mounted for movement to a position transverse of and closing the intake duct, and a plurality of closures disposed in the by-pass duct in substantial end to end contact closing said by-pass duct and connected to the closure in the intake duct for movement in unison therewith whereby air in the inlet duct is directed into and through the by-pass duct for delivery exclusively to the combustion chamber when the closure in the intake duct is so moved.

5. A power plant for aircraft comprising a turbo-jet engine and a ram-jet engine organized and arranged in tandem, an air intake duct individual to each engine, an air inlet duct common to both intake ducts, an exhaust duct common to both engines, a control valve located in each intake duct, a mount and drive common to both of said control valves, said mount rendering one valve in an open position with reference to the intake duct in which it is located and concurrently rendering the other valve in a closed position with reference to the intake duct in which it is located whereby only one of said engines is selectively and operatively connected to said inlet duct and said exhaust duct at a time, and means whereby the effective cross-sectional area of said exhaust duct may be varied to correspond to the requirements of the connected engine.

6. A power plant for aircraft comprising a pair of jet engines disposed in tandem, a pair of annular concentric air intake ducts one communicating with each engine, a plurality of closures disposed in side by side relationship in each said duct and mounted for rotation in unison to and from a position parallel one to the other whereby their duct is open and a position coplanar with their edges in contact one with the next whereby their duct is closed, the closures of one duct being disposed at all times at right angles to the closures of the other duct, and an actuator to rotate the closures in both ducts in unison.

7. A power plant for aircraft comprising a turbo-jet engine, an air intake duct at the forward end of said turbo-jet, an inlet duct for the delivery of air from the airstream to said intake duct, an exhaust duct at the aft end of the turbo-jet for the discharge of gases from the turbo-jet to ultimately provide forward propulsive thrust, a combustion chamber disposed rearwardly of the exhaust duct for the after-burning of the exhaust gases whereby augmented forward thrust is provided, a tailpipe for the discharge of the exhaust gases from the combustion chamber into atmosphere, a by-pass duct laterally disposed relative to the turbo-jet and opening at its forward end in the inlet duct and at its aft end into the combustion chamber, a pair of interconnected control valves one disposed in the intake duct and the other in the by-pass duct, said valves being mounted in opposite position relative to their respective ducts and to each other and operative in unison whereby the intake and by-pass ducts are concurrently opened and closed in the alternative and air in the inlet duct is directed exclusively into the open intake or by-pass duct, and fuel ejecting means mounted in the by-pass duct.

References Cited in the file of this patent

UNITED STATES PATENTS

| | | |
|---|---|---|
| 2,564,370 | Myers | Aug. 14, 1951 |
| 2,716,329 | Lunger | Aug. 30, 1955 |
| 2,825,204 | Kadosch et al. | Mar. 4, 1958 |